(12) United States Patent
Tsao (10) Patent No.: US 11,178,234 B1
(45) Date of Patent: Nov. 16, 2021

(54) METHOD AND APPARATUS FOR WEB BASED STORAGE ON-DEMAND DISTRIBUTION

(71) Applicant: Sheng Tai (Ted) Tsao, Fremont, CA (US)

(72) Inventor: Sheng Tai Tsao, Fremont, CA (US)

(73) Assignee: STT WebOS, Inc., Fremont, CA (US)

( * ) Notice: Subject to any disclaimer, the term of this patent is extended or adjusted under 35 U.S.C. 154(b) by 0 days.

(21) Appl. No.: 16/879,632

(22) Filed: May 20, 2020

Related U.S. Application Data (60) Continuation of application No. 16/389,870, filed on Apr. 19, 2019, now Pat. No. 10,791,181, which is a continuation of application No. 15/680,521, filed on Aug. 18, 2017, now Pat. No. 10,326,846, which is a continuation of application No. 15/214,798, filed on Jul. 20, 2016, now Pat. No. 9,787,780, which is a continuation of application No. 14/513,444, filed on Oct. 14, 2014, now Pat. No. 9,602,600, which is a continuation of application No. 13/663,710, filed on Oct. 30, 2012, now Pat. No. 8,909,976, which is a division of application No. 12/013,813, filed on Jan. 14, 2008, now Pat. No. 8,639,788, which is a division of application No. 10/713,905, filed on Aug. 12, 2002, now Pat. No. 7,379,990, application No. 16/879,632, which is a continuation-in-part of application No. 15/739,054, filed on Dec. 21, 2017, now Pat. No. 10,279,477, which is a continuation of application No. 14/267,831, filed on May 1, 2014, now abandoned, which is a continuation of application No. 12/075,314, filed on Mar. 4, 2008, now Pat. No. 8,799,473, which is a continuation of application No. 10/713,904, filed on Aug. 6, 2002, now Pat. No. 7,418,702.

(51) Int. Cl.
*H04L 29/06* (2006.01)
*H04L 29/08* (2006.01)
*H04L 12/24* (2006.01)

(52) U.S. Cl.
CPC .......... *H04L 67/16* (2013.01); *H04L 41/0813* (2013.01); *H04L 41/12* (2013.01)

(58) Field of Classification Search
CPC ..................................... H04L 67/16
See application file for complete search history.

(56) References Cited

U.S. PATENT DOCUMENTS 8,903,956 B2 * 12/2014 Acedo ............... G06F 3/0605
709/219
2019/0215363 A1 * 7/2019 Olson ............... G06F 3/0649

* cited by examiner

*Primary Examiner* — Adnan M Mirza (57) ABSTRACT

The distributed virtual SAN infrastructure of this invention provides a scalable dynamically expandable virtual storage volume service pool, which can satisfy the needs for storage on-demand application such as provide user access a specific size storage volume and can satisfy the needs for centralized operation of the storage servers verses traditional operation for storage system. Specially with web-based multitasking support, the accessing and operation of the storage system can be made much more efficient.

20 Claims, 8 Drawing Sheets

Distributed Virtual SAN Infrastructure

The UDP packet format used by "Virtual SAN Auto Configuration Protocol"

Fig. 4

Example of Storage Volume Information of an IP SAN Unit

Note: Each volume may further be partitioned into small chunk of partition.

Direct Attached Storage System:

Fig. 7

In-Band Accessed Virtual SAN

Recovery Scheme of the Distributed Virtual SAN Infrastructure

Fig. 10

METHOD AND APPARATUS FOR WEB BASED STORAGE ON-DEMAND DISTRIBUTION

CROSS-REFERENCE TO RELATED APPLICATION(S)

This application is a continuation of the U.S. patent application Ser. No. 16/389,870 filed on Apr. 19, 2019 and now a U.S. patent Ser. No. 10/791,181, which itself is a continuation of U.S. patent application Ser. No. 15/680,521 filed on Aug. 18, 2017 and now a U.S. Pat. No. 10,326,846, which itself is a continuation of U.S. application Ser. No. 15/214,798 filed on Jul. 20, 2016 and now a U.S. Pat. No. 9,787,780 which itself is a continuation of U.S. patent application Ser. No. 14/513,444 filed on Oct. 14, 2014 and now a U.S. Pat. No. 9,602,600, which in turn itself is a continuation of U.S. patent application Ser. No. 13/663,710 filed on Oct. 30, 2012, now a U.S. Pat. No. 8,909,976 which itself is a division of U.S. patent application Ser. No. 12/013,813 filed on Jan. 14, 2008 and now a U.S. Pat. No. 8,639,788, which in turn itself is a divisional application of U.S. patent application Ser. No. 10/713,905, filed on Aug. 12, 2002, converted on Jul. 22, 2003 from provisional application 60/402,626 filed on Aug. 12, 2002 and now a U.S. Pat. No. 7,379,990. This application is also a continuation in part of U.S. application Ser. No. 15/739,054 filed on Oct. 25, 2017, which itself is a continuation of U.S. application Ser. No. 14/267,831 filed on May 1, 2014, which itself is a U.S. patent application Ser. No. 12/075,314 filed on Mar. 4, 2008 and now a U.S. Pat. No. 8,799,473, which in turn itself is a continuation of U.S. patent application Ser. No. 10/713,904, filed on Aug. 6, 2002 that is converted from and non-provisional of U.S. Provisional Application No. 60/401,238, and now is a U.S. Pat. No. 7,418,702. All above applications and patents are herein incorporated by references in their entireties for all purpose.

FIELD OF THE INVENTION

The present invention generally relates to computer communications network. More specifically, the present invention relates to web-based data storage systems.

BACKGROUND OF THE INVENTION

Figure 7:
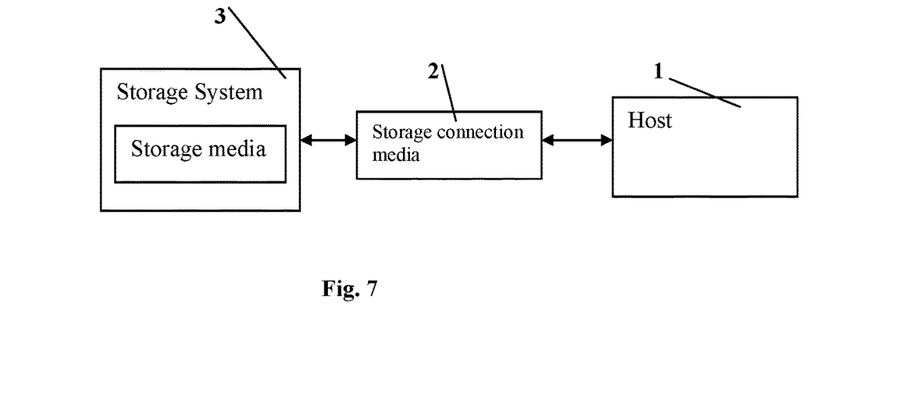
FIG. 7 is a conventional Direct Attached Storage System.

Today's corporate IT professionals typically face many challenges to handle the ever increasing information and data. To handle large amount of data, many organizations are required to expand their storage capacity by employing managed storage systems locally in order to maintaining their normal business operating. A conventional approach is to use IP based network attached storage ("NAS"), which effectively provides data storage and services for end users. Moreover, at the enterprise level, the majority storage systems are directly attached or connected to server(s) or host(s) as shown in FIG. 7. These server(s) and/or host(s) are typically access to raw block data devices through conventional communication connection media, such as traditional IDE, SCSI, Fibre Channel, or Ethernet.

The server, which is directly attached to a storage system as illustrated in FIG. 7 typically has many drawbacks, which are described as following:

A typical conventional storage system is only capable of handling 4 TB (terabytes) of data, which is usually not good enough to meet the demands for a typical enterprise storage system;

The most of servers, which are directly attached to storage systems, have problems for further expanding their storage capacity. Therefore, an organization may require to purchase new servers in order to increase storage capacity;

The storage being attached to a server can only be accessed by the attached server and can not be shared by other servers even if the server has larger amount of storage spaces not being used;

Each attached storage system has to be managed separately and this is a nightmare for IT professionals;

With the attached storage system, the backup/restore has to go through the data network, this will tax or reduce the network performance;

A typical SCSI connection only allows a 12-meter distance for data accessing with 15 storage devices. Similarly, Fibre Channel is limited to 10 kilometers communication distance. Distance limitation effectively prevents them from being the best choice for disaster recovery of the storage system; and The Fiber Channel based storage system cannot handle well for the interoperability. Also, Fibre Channel based storage system is expensive to build and to maintain.

Figure 8:
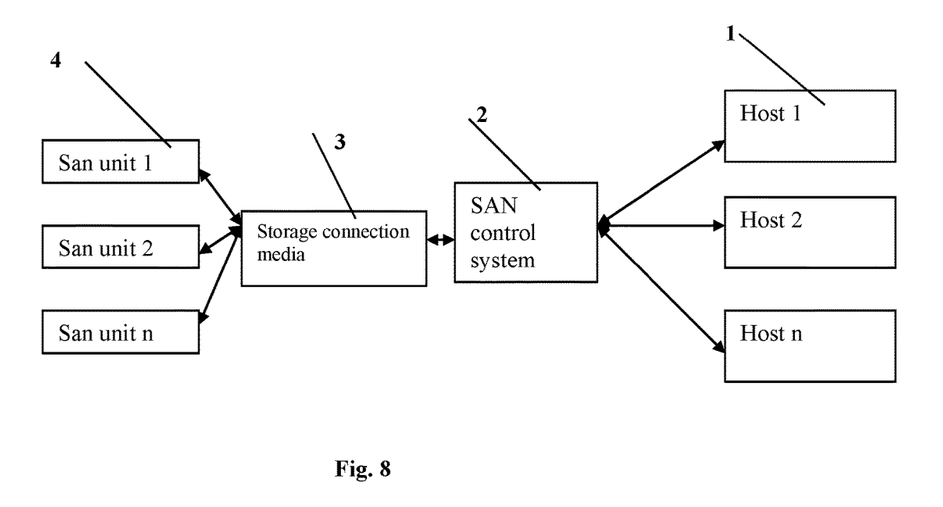
FIG. 8 is an in-bound accessed virtual storage system.

FIG. 8 shows a conventional type of virtual SAN, which is in-band controlled and accessed with which the data path from hosts 1 to the SAN units 4 going through virtual SAN control management station 2. It is not efficient in term of accessing the data by the hosts because the virtual SAN control management station can easily be a performance bottleneck. Similarly, the scalability of this type of virtual SAN is poor.

SUMMARY

Figure 1:
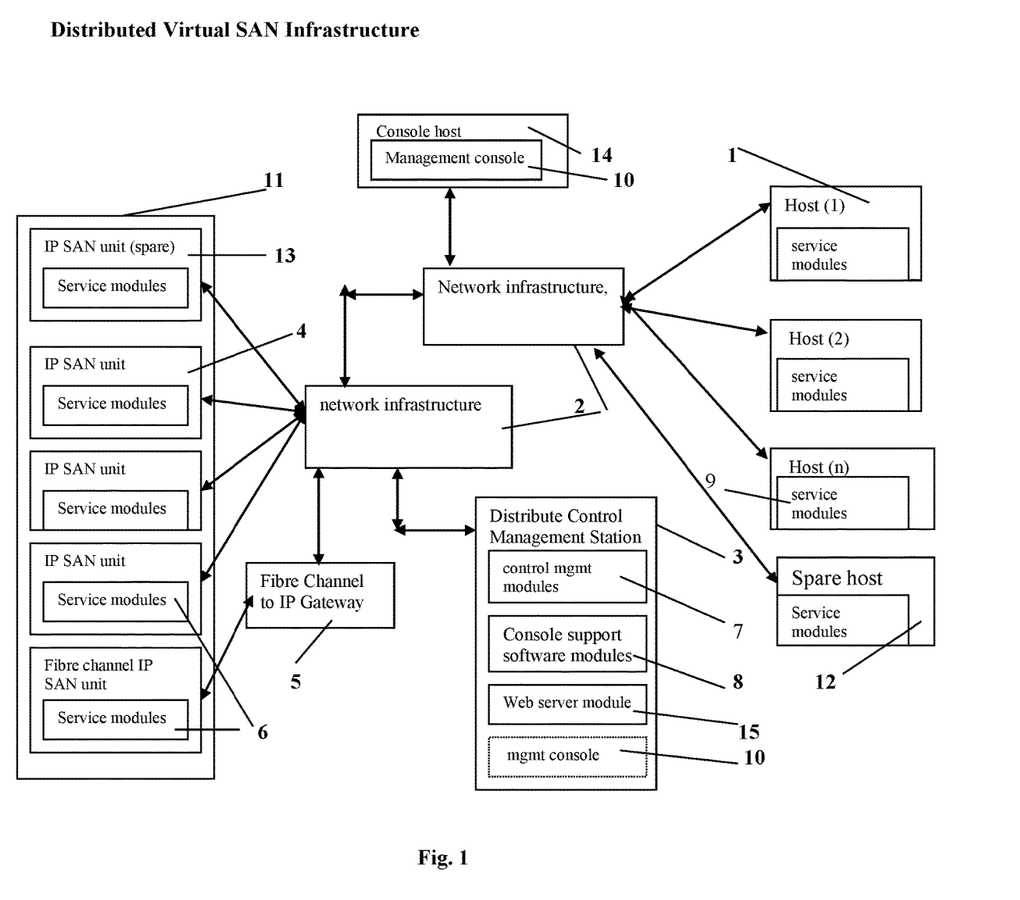
FIG. 1 illustrates a distributed virtual storage area of network ("SAN") infrastructure in accordance with one embodiment of the present invention.

With rapid development of high speed communication technology, the problems mentioned above can be solved by an IP based out-band accessed distributed virtual SAN infrastructure illustrated in FIG. 1 of this invention. The IP base virtual SAN provides a method of grouping multiple IP SAN units to provide a storage system with huge capacity to meet the demanding for increasing storage capacity for keeping business running normally. With this invention, each host 1 can directly access IP based SAN units 4 without going through control management station ("control system") 3. The IP based out-band accessed distributed virtual SAN infrastructure actually represents an example of central controlled distributed scalable virtual machine system (CCDSVM) illustrated in FIG. 9. Wherein, each system units actually is a SAN unit 4, specifically is an IP based SAN unit.

Figure 6:
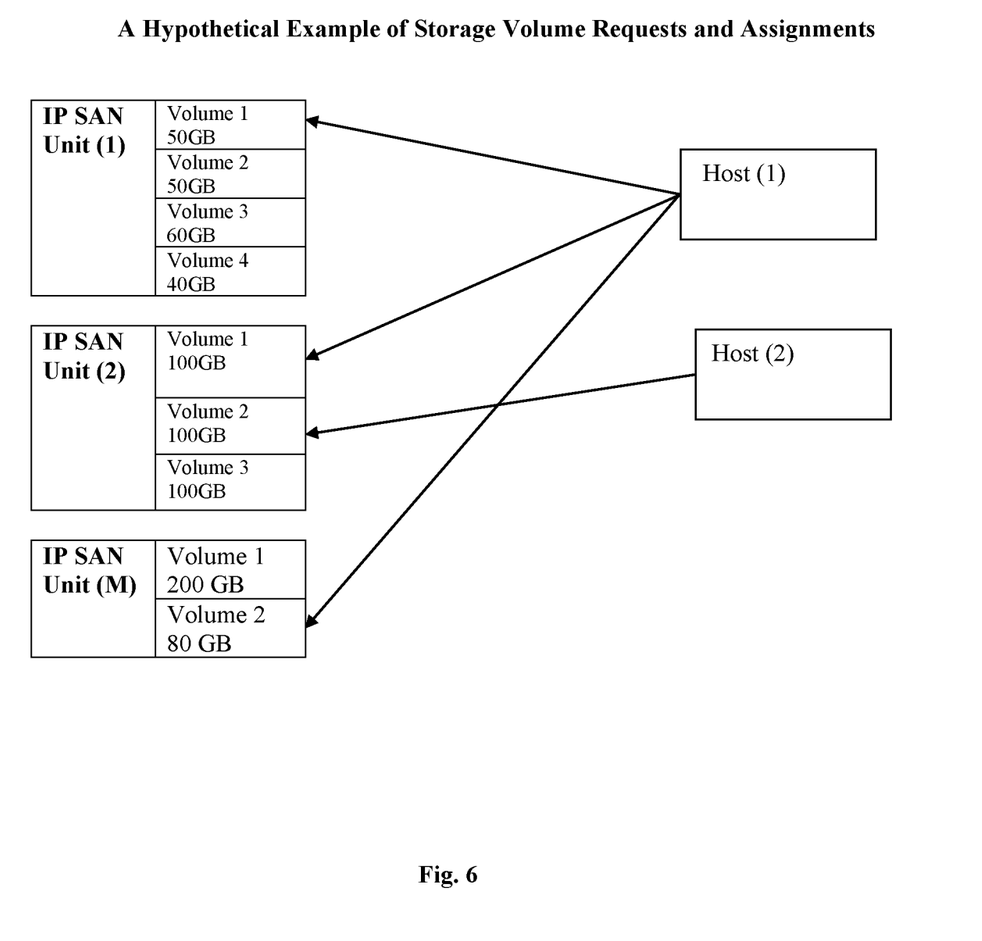
FIG. 6 illustrates a hypothetical example of storage volume requests and assignment in accordance with one embodiment of the present invention.

With this invention by referring to the FIG. 1 and FIG. 6, in one embodiment, each SAN unit 4 can be accessed by one or more hosts 1 and each host 1 can access one or more SAN units 4 as illustrated in FIG. 6. In addition, the storage accessing goes directly through communication link 2 between the hosts 1 and SAN units 4 without involvement of the control management station 3. Further, for increasing storage capacity, SAN unit 4 can be dynamically added at any time without interrupting normal data accessing of the existing SAN units 4 from the hosts 1. Further, all SAN units are centrally controlled, monitored, and managed by a control management station 3 through a management console 10 of a console system 14. The control management station 3 may also accept storage volume (or partition) requests from each host 1, and assign the matched volumes (or partitions) on the SAN units 4 to the requested hosts. Thereafter, each host 1 could directly access the right volumes (or partitions) on the assigned SAN units without going through the control management station 3 again.

This invention will become understood with reference to the following description, claims, and accompanying figures.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only. Specially, in the drawings, like elements are designated by like reference numbers.

DETAILED DESCRIPTION

The following terms are used through out this patent application to describe the present invention. A central controlled distributed scalable virtual machine ("CCDSVM") system in one embodiment allows a control management system to control a group of computing systems and to provide distributed services to client systems across the Intranet, Internet, and/or LAN environment. Storage media includes various types such as magnetic hard disk drives, solid state disk drives, optical storage drive, and memory card. Storage connection and control media may include controller such as IDE, SCSI, Fibre optical, Ethernet, and USB controller, or wireless media, and/or other related cable. Each controller for storage media such as Raid, IDE, or SCSI controller may control multiple storage media on a computing system. Storage system includes one or more storage media (devices), storage connection media, and storage media controllers. Storage system also contains related software modules for delivering storage services.

Storage area network ("SAN") is a storage system that is capable of providing block data services to various computer devices (hosts) through storage connection media, such as Fibre-optical cable, Ethernet cable or others by deploying Internet Protocol ("IP") based or non-IP based protocol. The non-IP based protocol, in one example, includes Fibre-Channel protocol. IP SAN uses IP based protocols to provide storage raw block data services. All discussions of the SAN in this invention are within the scope of a model of central controlled distributed scalable virtual machine ("CCDSVM").

DNS stands for domain name service for the Internet network. DNS is an Internet software infrastructure and is capable of identifying network addresses and name for computing systems. For example, the network addresses may be used by a computing system to communicate with the peer systems. A Simple Network Management Protocol ("SNMP") is a standard Internet protocol for managing computing system on a network. A SNMP trap is a user datagram protocol ("UDP") packet, which may be sent by a SNMP daemon on a SNMP agent system to a SNMP network management station via network links.

FIG. 1 shows an example of a simplified block diagram of IP based out-band accessed distributed virtual SAN infrastructure. The distributed virtual SAN infrastructure includes multiple hosts 1, network infrastructures 2, a control management station 3, a virtual storage pool 11 having multiple IP SAN units 4, and a management console 10. In one embodiment, each of the hosts 1 contains service software modules 9. The service software modules 9 are configured to communicate with a control management software module 7 of the control management station 3 for obtaining information of a specific one of the IP SAN units 4, and performing tasks distributed from the control management system 3, e.g. upon tasks submitted from a management console 10. The service software modules 9 also communicate with service software modules 6 of each of the IP SAN units 4 for access block data service provided by the each of the SAN units 4. For example, each of the hosts 1 can create a local file system or create a local database by using block data service delivered through storage volumes of the virtual SAN. The service software modules 9 can be coded or implemented with suitable programming languages such as C, C++, Java or others. The service software modules 9 may also use suitable protocols such as IP based or non-IP based protocols.

The host 1, in one embodiment, could be a server, a desktop, a laptop PC, or a communication system or device, which needs to access block data storage. The spare host 12 represents a part of recovery scheme that could be implemented in a CCDSVM environment.

Network infrastructure 2 comprises many kinds of links such as data link. The network infrastructure 2 could be a storage backbone of an enterprise, a department LAN, a corporate intranet, an Internet infrastructure or others such as WAN (wide area network). In one embodiment, network infrastructure 2 includes switches, routers, gateways, cables (Ethernet, optical Fibre), wireless communication media, or others. The network infrastructure 2 provides data path between the hosts 1, the distribute control management station 3, and the SAN Units 4. The network infrastructure 2 also includes software infrastructure such as DNS or DHCP for facilitating computing systems on the network to identifying a target addresses of a another computing system for sending or receiving data within a network domain or in a cross-domain network environment.

It should be noted that DNS and/or other Internet address identification mechanism may be used when a message or data stream is sent from a system A to a system B across a network, such as via communication link of the network infrastructure.

The control management station 3 includes distributing control management software modules 7 and console support software modules 8. To support web-based console, it requires the web server software 15. The distribute control management software modules 7 communicate with service modules 6 of each of the IP SAN units 4 to retrieve storage information for constructing a virtual SAN storage service pool 11. The communication between the distributed control management software modules 7 and the service modules 6 of each of the IP SAN units 4 is further configured to monitor each of the IP SAN units, and to perform various system operations, such as storage configuration and partitioning. The control management software modules 7 also communicate with service software modules 9 of each of the hosts 1 for distributing storage volumes to each of the hosts 1. The distribute control management software modules 7 can be implemented with suitable programming languages such as C, C++, Java, XML, and others. The communication protocols between control management station 3 and IP SAN units 4 could be suitable IP based protocols. The communication between the control management station 3 and hosts 1 can be suitable IP base or non-IP based protocols.

The console support software modules 8 employ inter-process communication mechanism to obtain information relating to each of the IP SAN units (4) from the distributed control management software modules 7. The console support software modules 8 further provide the obtained information to web server software 15 through the inter-process communication mechanism. The console support software modules 8 can be implemented with suitable programming languages such as C, C++, Java, XML.

The web server software 15 communicates with the management console software 10 on the console host 14 through web protocol such as HTTP for providing the obtained information, e.g. via a web user interface ("UI"), for centralized storage management for the entire distributed virtual SAN infrastructure across a network. The web server software 15 could be commercially available software or other proprietary software.

To simplify foregoing discussion, the communication path mentioned above will be simply referred to as the console support software modules 8 communicate (send/receive data) with the management console 10 of the console host 14 without further mentioning the role and function of web server software 15 of the control management station 3.

In addition, to support non-web based console, the web server software 15 on the control management station 3 is often not required. In this case, the console support software modules 8 could communicate with the management console software 10 with a suitable protocol other than a web protocol such as HTTP.

Figure 5:
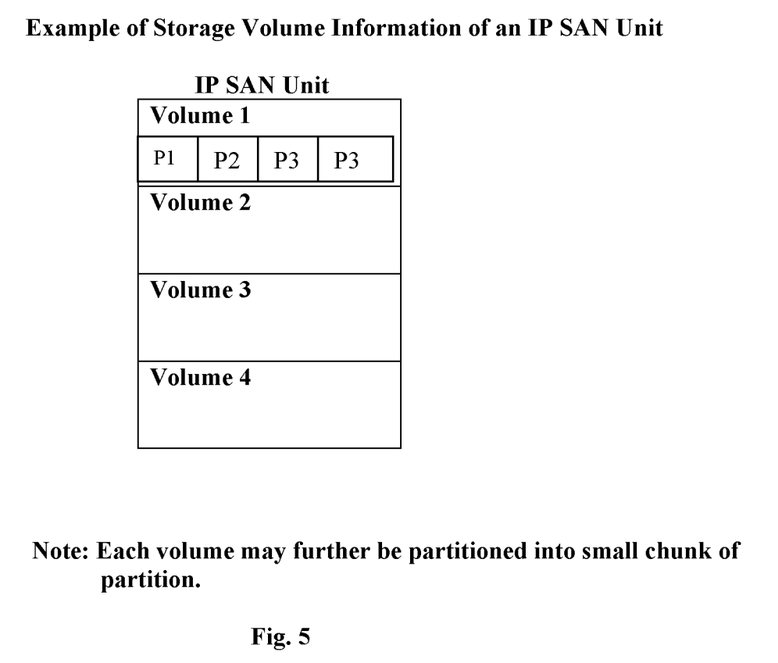
FIG. 5 illustrates an example of storage volume information of an IP SAN Unit in accordance with one embodiment of the present invention.

The virtual storage pool 11 includes multiple IP SAN units 4, wherein each of the IP SAN units further includes service modules 6 and is configured with storage media, storage communications and control media. The storage media of each of the IP SAN units 4 is configured to have one or more logical volumes. Each storage volume, in one embodiment, is further partitioned into several partitions as shown in FIG. 5. The service software modules 6 are configured to communicate with distribute control management station 3 for providing storage information and for performing storage operations distributed from the control management station 3 such as for partitioning storage volumes. The service software modules 6, in another embodiment, are further configured to communicate with service software modules 9 of each of the hosts 1 for providing block data services to the hosts 1. The service software modules 6 can be implemented by suitable programming languages such as C, C++, Java, and they may employ suitable IP based communication protocols for data transfer.

In one embodiment, the control management station 3 organizes the IP SAN units 4 to form the virtual storage pool 11. The virtual storage pool can be represented by a storage information list, where each entry on the list comprises information for a SAN unit, such as SAN Unit's name and IP address, status such as online or down, storage media information such as disk drives or raid, storage configuration information such as number of storage volumes and each storage volume's starting logical block address (LBA) and length, and allocation information. A spare IP SAN unit 13 represents a part of recovery scheme used in the centrally controlled distributed scalable virtual machine environment.

A Fibre channel to IP gateway 5 is a component that is configured to provide translation between Fibre Channel based protocol and IP based protocol so that a Fibre Channel based SAN unit will appear as if a IP based SAN unit to the rest of the world (FIG. 1).

Fibre channel SAN unit is similar to an IP SAN unit 4 except it uses Fibre Channel storage controller, which uses Fibre Channel protocol to communicate with other parties over a network. In addition, a Fibre Channel SAN unit appears as an IP based SAN unit to the distributed virtual SAN once it connects to the Fibre Channel to IP gateway 5. Therefore, to simplify the foregoing discussion, a fibre channel SAN unit will be treated similarly as an IP SAN unit in all of following discussion without additional comments.

The management console 10 on the console host 14, which has been described in pending patent application of "Concurrent Web Based Multi-Task Support for Control Management System" of application Ser. No. 10/713,904 filed on Aug. 6, 2002 and converted on Jul. 22, 2002 from provisional application 60/401,238 which is filed on Aug. 6, 2002 by the same author and is incorporated herein by reference in its entirety for all purpose. The management console 10 could be a commercially available web browser or a proprietary web browser. A web browser 10 is able to communicate with web server software 15 on the control management station 3 through a web protocol such as HTTP. The Web browser 10 could be implemented by suitable programming languages such as C, C++, Java, XML. In addition, the management console software module 10 could be a networked software module other than a web browser software. In this case, a suitable network protocols can be used instead of using web protocol such as HTTP.

To simplify the foregoing discussion, the communication path between the management console 10 of the console host 14 and the console support software modules 8 of the control management station 3 will not further mention the role or function of the web server software module 15 in this invention.

From a management console 10, multiple concurrent system operations and tasks can be performed by user for the entire distributed virtual SAN infrastructure. There are may be one or more management consoles of the distributed virtual SAN infrastructure on the network infrastructure.

Figure 2:
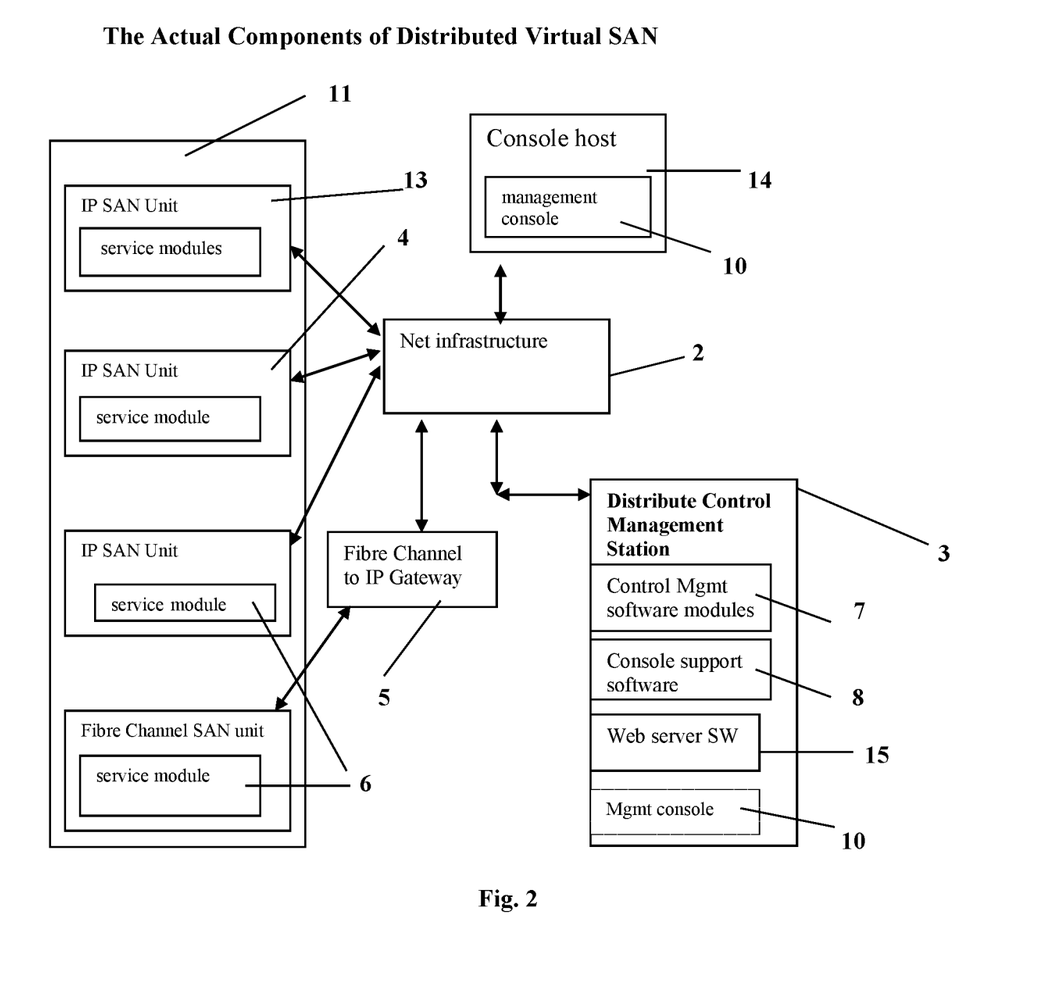
FIG. 2 illustrates actual components of Distributed Virtual SAN in accordance with one embodiment of the present invention.

FIG. 2 illustrates a portion of FIG. 1 relating to an actual virtual SAN. The multiple SAN units 4 form a virtual storage pool 11. The virtual storage pool 11 may contain information of each of the IP SAN units' IP address, the storage volumes and their sizes configured on each storage device.

Figure 3:
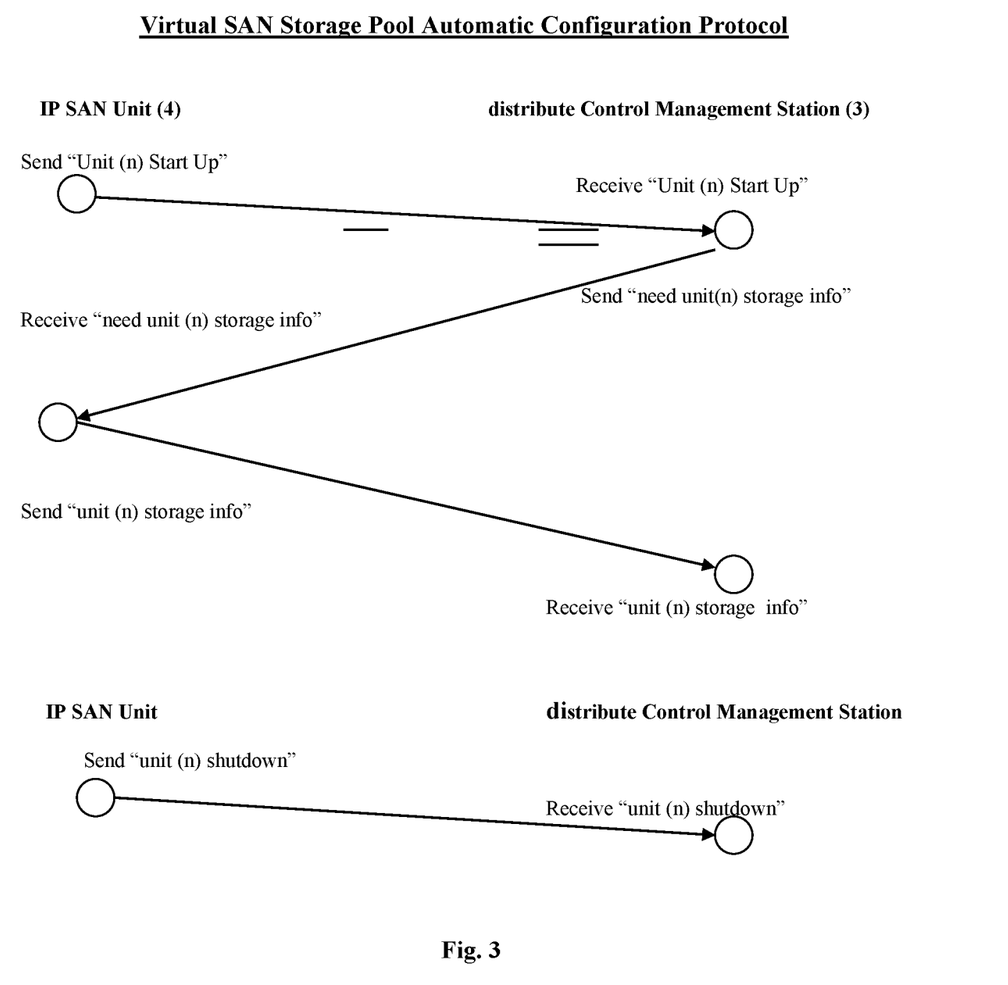
FIG. 3 illustrates Virtual SAN automatic configuration protocol in accordance with one embodiment of the present invention.

FIG. 3 shows a protocol for a virtual SAN automatic configuration as well as for shutting down a SAN unit 4 in the virtual storage pool 11 of the virtual SAN. The packet format used with this protocol is described in FIG. 4.

Figure 4:
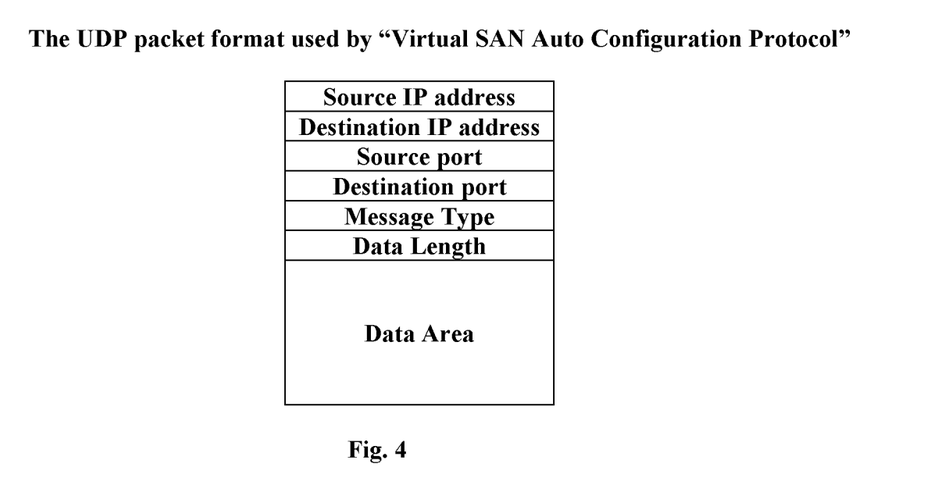
FIG. 4 illustrates a packet format used for message communication in a Virtual SAN automatic configuration protocol in accordance with one embodiment of the present invention.

FIG. 4 shows the message format, which is used by "Virtual SAN Automatic Configuration Protocol" for sending and receiving a packet. The packet contains both source and designated address information for sender and receiver; therefore, the packet can be transmitted cross the Internet without Internet address identification mechanism such as the DNS, or DHCP if both the source and designated addresses are known.

FIG. 5 illustrates storage layout in an IP SAN unit 4, wherein the storage layout may be further configured into multiple volumes and each volume may be further partitioned into multiple partitions. Each volume refers to a logical storage unit in this discussion and it might contain one or multiple pieces of storage partitions from multiple storage hardware media.

FIG. 6 is a simplified and a portion of FIG. 1, which shows a hypothetical example of how hosts are configured to access the storage volume of IP SAN units. Where the IP SAN units 4 are a portion of the virtual storage pool 11 and each host is substantially the same as presented in FIG. 1.

FIG. 8 is a block diagram illustrating an In-Band Accessed Virtual SAN. FIG. 8 shows another type of virtual SAN, where, the actual storage data path from hosts to IP SAN units has to go through control management station.

Figure 9:
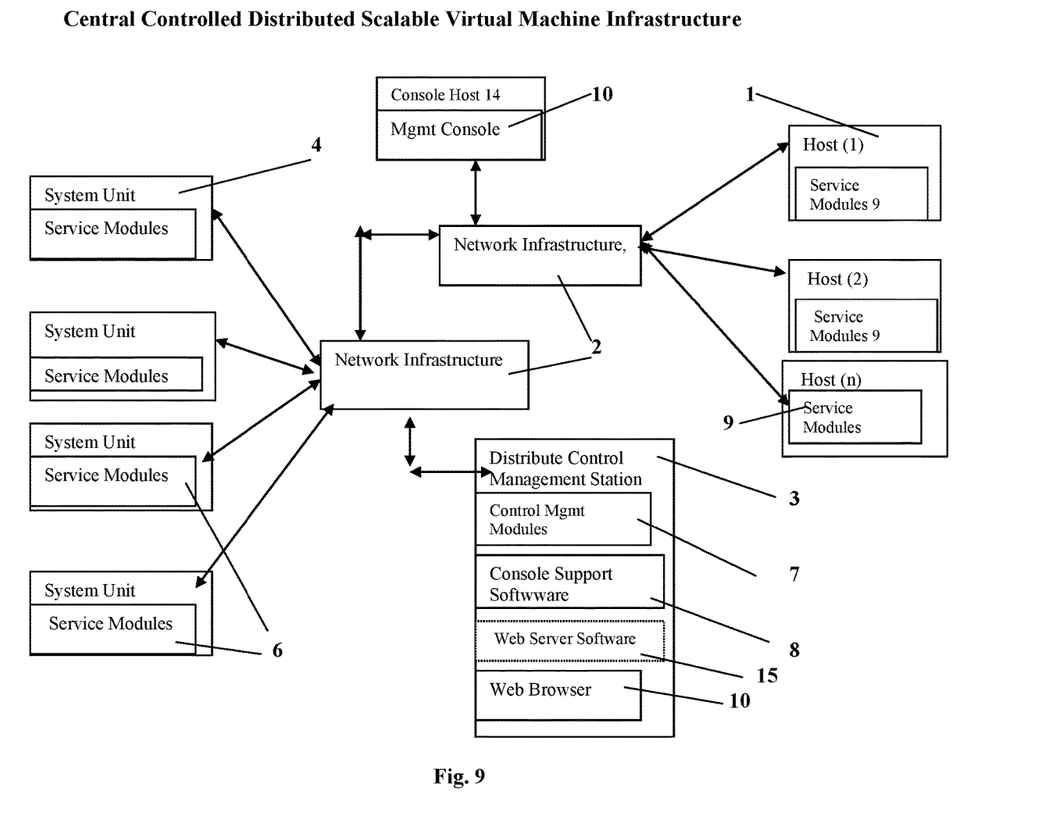
FIG. 9 illustrates a simplified diagram of a central controlled distributed scalable virtual machine system in accordance with one embodiment of the present invention.

FIG. 9 is a Simplified diagram of central controlled distributed scalable virtual machine ("CCDSVM"). With this invention, the systems in a CCDSVM can be flexibly configured into multiple different types of service pools according to their functionalities. For example, multiple IP SAN units 4 can form a virtual SAN storage pool. The hosts of the CCDSVM could form other service pools to provide services other than storage services such as video services, security monitor services, web service, file service, database service and other services provided on the world wide web (or across a network) by using storages in the virtual SAN infrastructure.

Figure 10:
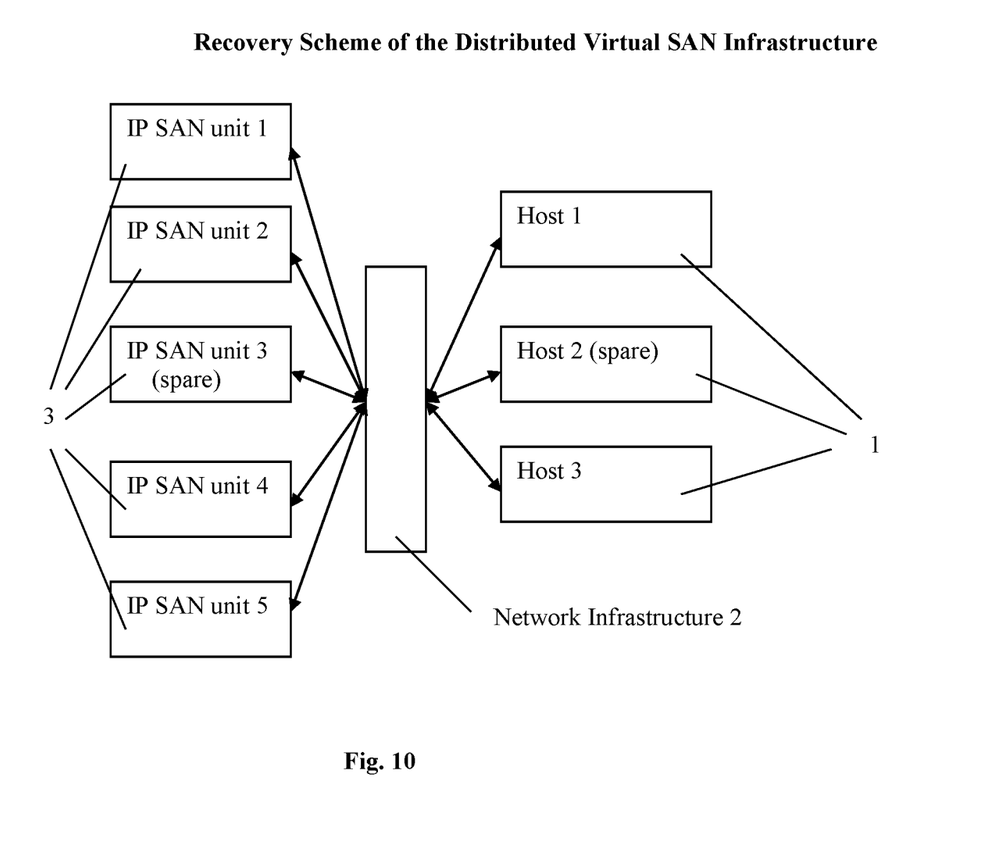
FIG. 10 illustrates a simplified diagram of disaster recovery scheme of a distributed virtual san infrastructure in accordance with one embodiment of the present invention.

FIG. 10 is a simplified diagram of disaster recovery scheme of the distributed virtual SAN infrastructure, which includes one virtual storage pool 11 of multiple IP SAN units 4 and one service pool of multiple hosts 1. For example, host 1 (1) accesses IP SAN units 4 (1) and (2) while host 1 (3) accesses IP SAN units 4 (4) and (5). Also, IP SAN units 4 (1) and (2) are mirrored so that they may kept the similar copy of data for host 1 (1). The same to be true for IP SAN units 4 (4) and (5) with host 1 (3). In addition, IP SAN unit 4 (3) may be a spare unit and the host 1 (2) could be a spare host for providing fault replacement in case a fault occurred.

FIG. 1 shows a simplified diagram of a distributed virtual SAN infrastructure according to the present invention. With the distributed virtual SAN infrastructure, the distributed virtual SAN storage pool 11 comprises one or more SAN units 4, which may be further connected to a distribute control management station 3. The SAN units 4 can be accessed by one or more hosts 1 via the network infrastructure 2. The entire distributed virtual SAN infrastructure can be operated through a management console 10 for centralized operation.

The virtual storage volume pool 11 of the distributed virtual SAN infrastructure can be initiated and updated when each of the IP SAN units 4 is booted up and brought to online. The virtual storage volume pool 11, in one embodiment, is updated when at least one of IP SAN units is powered down or removed from the web environment. FIG. 3 shows the distributed Virtual SAN Automatic Configuration Protocol, which leads to the success of constructing the virtual storage pool 11 of the distributed virtual SAN infrastructure according to this invention. The following steps are for automatic building the storage volume pool 11 of the distributed virtual SAN based on the protocol illustrated in FIG. 3. The protocol described bellow could be IP based protocol such as SNMP, or a much simple UDP based protocol as illustrated in FIG. 4, or other suitable protocols.

When one of the IP SAN units 4 such as unit (n) brought up online, SAN service modules 6 of the one of IP SAN units 4 sends out a "SAN unit (n) startup" packet (message), as illustrated in FIG. 4, to the distribute control management station 3. The "SAN unit (n) startup" packet could be a simple user defined UDP packet indicating a storage system labeled with an number "n" just being powered up. The message carried by the packet could also be a SNMP trap of cold start packet, or link-up packet if the communication link of the IP SAN unit 4 was previously down, or other short packet/message of a suitable IP protocol.

When the distribute control management modules 7 of the distribute control management station 3 receives the IP SAN unit (n)'s message, it stores the IP SAN unit (n)'s information, such as storing into a storage information list for the virtual storage pool 11.

After storing information of the IP SAN unit, the control management modules 7 on the distribute control management station 3 sends back a "need SAN unit (n)'s storage info" packet to the IP SAN unit (n) 4.

When the SAN service modules 6 of the IP SAN unit (n) 4 receive the packet of "need SAN unit (n)'s storage info", the SAN service modules 6 obtain the storage information on the IP SAN units (n) 4, which may include the number of storage volumes, each storage volume's starting address (logical block address, LBA), length (size), and the end address (logical block address, LBA). The SAN service modules 6 then send back a packet of "unit (n) storage info", which may include all information obtained, to the control management station 3.

After receiving the "unit (n) storage info" packet from the IP SAN unit (n) 4, the distribute control management modules 7 of on the distribute control management station 3 update the stored information of the virtual storage pool 11 by including corresponding storage information of the IP SAN unit (n) obtained from the packet.

When an IP SAN unit (n) is shutting down, the service module 6 of the IP SAN unit (n) 4 sends a "Unit (n) shutdown" message to the distribute control management station 3. This shutdown message could be an SNMP trap of link down, or a simple UDP packet as illustrated in FIG. 4 with a message type of system down, or other short packet based on some other protocols.

After receiving of the "unit (n) shutdown" packet from the IP SAN unit (n) 4, the distribute control management modules 7 on the distribute control management station 3 update the stored information of the virtual storage pool 11 for the IP SAN unit (n) 4, for example, updating and marking the status of the IP SAN unit number (n) as down in an entry of the storage information list. In addition, other information may be also updated, for example, updating the total size of the virtual storage capacity as well as updating client hosts storage volume allocation information.

After one or more IP SAN units 4 are brought online, the control management station 3 obtains the stored information relating to storage volumes and network for every IP SAN unit 4 in the virtual storage pool 11. Therefore, the control management station 3 can control the entire virtual SAN and is able to distributed storage volumes to hosts 1 based on request in several steps in respect to the FIG. 6:

First, a host 1 numbered as (1) sends a request to the control management station 3 for requesting a storage space, such as for a 80 GB (gigabyte) of storage. Second, the control management station 3 stores information of the host 1 (1) and searches for availability of the 80 GB of storage volume from the virtual storage pool 11. The control management station 3, for example, finds an 80 GB available storage volume labeled as volume number (2) in an IP SAN unit 4 labeled as (M). Third, the control management station 3 sends the requested information of the host 1 (1) to the IP SAN unit 4 (M), where the requested information includes the IP address of the host 1 (1) and the requested storage size. The control management station 3 also sends the storage volume (2) information relating to the IP SAN unit 4 (M) to the host 1 (1), where the storage volume (2) information includes the IP address of the IP SAN unit 4 (M), the storage volume number and the size, the storage volume's starting and ending logical block address (LBA). Therefore, all parties of three, namely the control management station 3 and the host 1 (1) and the IP SAN unit 4 (M) are synchronized for keeping the same mapping of the storage volume assignment information. Fourth, once the host 1 (1) and the IP SAN unit 4 (M) get each other's information, the host 1 (1) can directly and independently access the storage volume (2) on the IP SAN unit 4 (M) immediately without going through the control management system 3, and the IP SAN unit 4 (M) in one embodiment is further configured to perform security checking in light of permission for storage accessing by the host 1 (1).

Alternatively, the above described steps for distributing storage volume may also be semi-automatically setup with assisting of operations performed via the management console 10. For example, an administrator via the management console 10 of a console host 14 could manually setup the storage volume (2) of the IP SAN unit 4 (M) to be exclusively accessed by the host 1 (1) as long as the administrator acknowledges that the host 1 (1) needs such size of storage volume. The administrator can also manually setup the host 1 (1) with all information needed to access the storage volume (2) of the IP SAN unit 4 (M). Finally, the host 1 (1) can access to the storage volume (2) of the IP SAN unit 4 (M) directly without going through the control management station 3.

The present invention also discloses a mechanism of dynamically expanding storage capacity. After the distributed virtual SAN storage pool 11 is built, each of the hosts 1 will be able to access the storage volumes on one or more of the IP SAN units 4 in the pool 11 directly without further involvement of the control management station 3. This will allow the virtual storage pool 11 of the distributed virtual SAN infrastructure to continue expanding its capacity by adding one or more SAN storage units 4, without affecting the hosts 1 to continue accessing the storage volumes on the assigned IP SAN units 4 in the virtual storage pool 11. This guarantees that the capacity of the distributed virtual SAN storage pool 11 can be dynamically expanded without interrupting normal storage operations and accessing of the entire distributed virtual SAN storage pool 11.

The present invention further discloses a technique of system scalability. Once the distributed virtual SAN storage pool 11 is constructed, each host 1 can access one or more IP SAN units 4 in the virtual storage pool 11 of the distributed virtual SAN infrastructure whenever the host 1 sends a request. For example, the host 1 (1) illustrated in FIG. 6 can access three IP SAN units that numbered as SAN unit 4 (1), unit (2), and unit (M) after the host 1 (1) requests for storage volumes, subsequently, the control management station 3 grants each of the requests. This effectively provides scalable storage system for the hosts 1 (1) within distributed virtual SAN infrastructure of this invention. Further, the distributed virtual SAN infrastructure provides far better scalability than the in-band accessed virtual SAN as illustrated in FIG. 8, wherein the scalability of in-band accessed virtual SAN were severely limited by a bottlenecked control management station.

The present invention also discloses a method of storage sharing mechanism. Once the distributed virtual SAN storage pool 11 is constructed, each IP SAN unit 4 in the virtual storage pool of distributed virtual SAN infrastructure may be hold multiple storage volumes in the form of block data, which can be accessed by one or more hosts 1. Therefore, this allows multiple hosts (1) to share an IP SAN unit 4 by granting and assigning each of the hosts to exclusively access one of the storage volumes on the IP SAN unit 4. The FIG. 6 demonstrates such a storage sharing, where the IP SAN unit 4 number as (2) has three volumes, which named as volume (1), volume (2), and volume (3). The block data service modules 6 of the IP SAN unit 4 (2) allows a volume (1) to be accessed exclusively by a host 1 (1) while volume (2) to be accessed exclusively by a host 1 (2).

With in-band accessed traditional SAN as illustrated in FIG. 8, the control management station could be a performance bottleneck. With distributed virtual SAN of this invention, each host 1 can directly and independently access IP SAN units 4. Therefore, the performance of storage accessing by each host will not be affected by the control system, yet can match the performance of directly attached storage system as illustrated in FIG. 7 when the highspeed network connecting media is deployed in the distributed virtual SAN infrastructure.

The present invention also illustrates a method of a centralized management of distributed virtual SAN infrastructure for all IP SAN units 4, control management system 2 and hosts 1 within the infrastructure. As discussed before, the storage management console 10 on a console host 14 can communicate with the console support software module 8 of on a control management station 3 for obtaining information relating to all IP SAN units 4 and hosts 1 from the control management modules 7 of the control management station 3. Therefore, the management console 10, e.g. through a web user interface ("UI"), can provide centralized management functionality for the entire distributed virtual SAN storage pool 11, for the hosts 1, and for the control management station itself 3. With multiple concurrent tasks supported by the console support software modules 8 of the control management station 3, the storage management console 10 can efficiently provide full range of system operations and tasks. In addition, multiple tasks and operations can be run concurrently throughout the entire distributed virtual SAN and the hosts 1. These management tasks include storage configuration, storage volume allocation (assignment) for hosts or de-allocation for hosts, storage partitioning and repartitioning, storage backup or restore, fault handling, and monitoring status of storage, network, and other resource usage and activities.

In one embodiment, the present invention discloses a process of disaster recovery mechanism. The use of DNS or an IP address identification mechanism can help this distributed virtual SAN infrastructure to overcome the geometric (region) limitation, and works well in a cross network domain environment or in a single network domain environment. Therefore, the IP SAN units 4 or hosts 1 as well as a control management station 3 could be anywhere on the corporate Intranet, department LAN, WAN or Internet. As a result, the present invention can be used for an emergency or a disaster recovery plan because the distributed virtual SAN infrastructure can be implemented with a range beyond 100 miles as oppose to the traditional 10-kilometer limitation.

In addition, the disaster recovery plan of distributed virtual SAN infrastructure can be flexibly implemented as showing in FIG. 10. With this recovery plan, the host 1 numbered as (1) or (3) can continue to operate even if one of mirrored IP SAN units 4 serving the host (1) or host (3) is failed. Also, a spare IP SAN unit 4 can be used to quickly replace the failed IP SAN unit 4 whenever there is a need. On the other hand, the hosts 1 illustrated in FIG. 10 also can be organized into a service pool for providing special services, such as distributing video services, distributed database pool for database service, distributed security monitor services, and all other services provided on the network or the World Wide Web. Therefore, whenever the host 1 (1) or (3) has failed, a spare host 1 (2) can quickly take over the host 1 (1)'s or the host 1 (3)'s assigned IP SAN storage and replace the host 1 (1) or the host 1 (3) to continue providing services to the end user computing devices.

It should be noted that the storage of a IP SAN unit 4 can be shared and accessed by multiple hosts. To scale a virtual storage, a host may be assigned to access multiple volumes of storage capacities from multiple IP SAN units. In one embodiment, the storage access goes directly through communication link between hosts 1 and SAN units 4, which means that it is an out-band access. An advantage of using the present invention is that it has better performance and scalability than that in-band accessed virtual SAN. Furthermore, the present invention allows the virtual storage pool 11 to expand dynamically through adding more IP SAN units into the pool 11 without interrupting systems operation.

The distributed virtual SAN infrastructure can be managed and monitored from a centralized console 10. Also, the IP based distributed virtual SAN infrastructure is an embodiment of central controlled distributed scalable virtual machine (CCDSVM). The software modules implemented in the IP based distributed virtual SAN infrastructure are formed a web based virtual operating system model. Furthermore, the methods and principles of automatically constructing the IP based distributed virtual storage pool can be applied to non-IP base SAN and to many other type of distributed virtual machine, e.g. to automatically build different type of application service pools for hosts delivering various on-demand service and to provide ability of group based management for hosts and the virtual storage pool. The present invention can also apply to various data distribution services within the CCDSVM infrastructure. To effectively apply the method and principle of automatic constructing virtual storage pool of this invention to other types of application service pools served by hosts, each host need to be configured to provide a unique service, such as configured for a host providing video service. In addition the "storage information" in the protocol for automatic constructing storage service pool needs to be replaced by specific service information, for example replaced by "video file information" for video service. Thus, a specific application service pool can be automatically created to deliver the specific service to client system. In addition, the different type of application service pools will have similar advantages as the storage service pool does, such as dynamical capacity expanding, scalability, performance, disaster recoverability, security, centralized management and support service on-demand.

The invention claimed is:

1. A web system for delivering storage service, comprising:
   at least a first storage volume pool of a plurality of storage volumes constructed from a plurality of storage servers,
   at least one control server, and
   a plurality of user devices, including a first device of a first user, the web system being configured across a network infrastructure;
   wherein the control server controls the user devices accessing the storage volumes in the first storage volume pool that includes:
      receiving a request for acquiring storage volume from the first device;
      assigning, through the first storage volume pool, a first storage volume of a specific size to the first user for facilitating the first user from the first device to remotely and exclusively access the first storage volume;
      processing a first task received from the first device when the first user submitting the first task for accessing the first storage volumes;
   wherein the first device executes a browser to display information of the first storage volume for facilitating the first user through the information displayed to submit the first task, and couples with the control server to process the first task without blocking the browser to allow the first user submitting a second task from the browser before completion of the first task.

2. The web system of claim 1, wherein said constructing a first storage volume pool further comprises: executing a storage service pool automatic construction protocol between the control server and each of the storage servers, the protocol executed by the control server comprising:
   a) receiving a packet, sent automatically from a first one of the storage servers, the packet informing the control server that the storage server is going online;
   b) storing identification information of the first storage server, obtained via the packet received, into a storage information list for the first storage volume pool, and
   c) sending an enquiry packet back to the first storage server for requesting storage information of the first storage server for supporting storage distribution and management;
   d) receiving from the first storage server a response packet, the response packet comprising the storage information required by the enquiry, including information of at least one storage volume configured within the first storage server; and
   e) updating the storage information list for the first storage volume pool with the storage information of the first storage server according to the response packet received;
   f) repeating to execute the steps of a) to e) above by the control server with rest of the storage servers for constructing the storage information list to represent the first storage volume pool.

3. The system of claim 2, wherein said storage information list comprises a plurality of entries and information of total capacity, where each entry containing information of one of the storage servers, including associated name, internet protocol (IP) address, status of up or down, number of storage volumes configured on storage media and each storage volume's starting address and size, and allocation information.

4. The system of claim 3, wherein each storage volume is a logical storage unit further comprising one or more storage spaces configured on one or more storage mediums.

5. The web system of claim 1, wherein said assigning a first storage volume of a specific size further comprises:
creating a mapping comprising names and network addresses of the first device and a storage server on which the first storage volume residing, and starting address and size of the first storage volume; and
synchronizing the mapping between the first device, the storage server and the control server for controlling the exclusive accessing of the first storage volume.

6. The web system of claim 5, wherein said access the first storage volume further comprises: from the first device storing a file therein or retrieving a file therefrom, or transferring a file from the storage volume to another remote device.

7. The web system of claim 1, wherein said assigning a first storage volume of a specific size further comprises: creating a file system on the first storage volume and sending information of the first storage volume to the first device.

8. The web system of claim 1, wherein said control server being configured to processing tasks comprises:
processing the first task received from the first device including:
(1) storing information of the first task into an available entry of a user space task list on the control server and invoking a lock protection for protecting the storing of the information;
(2) processing the first task in the background according to the information stored, and
(3) sending a response to the browser on the first device without waiting for completion of the first task; and
responding to a second task received from the first device before completion of the first task when the first user through the browser submitting the second task for accessing the first storage volume; and
removing the stored information of the first task after the completion of the first task.

9. The web system of claim 8, wherein said sending a response to the browser comprises:
obtaining status of processing the first task and sending the status to the browser on the first device for displaying and monitoring the status of processing the first task.

10. The web system of claim 8, wherein said first device, coupling to the control server, to process the first tasks further comprises:
storing information of the first task into an available entry on a user space task list on the first device and invoking a lock protection for protecting the storing of the information of the first task;
processing the first task in the background according to the stored information of the first task and delivering a response, comprising status of processing the first task, to the browser without waiting for completion of the first task;
responding to a second task from the first device before completion of the first task when the first user through the browser submitting the second task for accessing the first storage volume; and
removing the stored information of the first task after the completion of the first task.

11. The web system of claim 10, wherein said delivering a response further comprises: delivering a response to the browser, where the response is generated by the first device or received from the control server.

12. The web system of claim 8, wherein said first device, coupling to the control server, processing the first task further comprises: sending the first task to the control server to further processing and receiving a response from the control server, the response being a status or result of the processing of the first task.

13. The web system of claim 2, wherein said web system delivering storage service comprising:
causing displaying of the first storage volume pool in a browser on a console device for managing and monitoring the first storage volume pool to reflect dynamic changing status of each of the storage servers.

14. The system of claim 13, wherein said reflecting dynamic changing status of each of the storage servers comprises: reflecting at least changing status of down or up of a storage server, assigning (allocation) or de-allocation of a storage volume, or partition or re-partition of a storage device.

15. The system of claim 1, wherein said control server controlling the user devices accessing the storage volumes further comprises: assigning, through the first storage volume pool, a second storage volume to a second user of a second device for the second user exclusively accessing the second storage volume, and processing each task submitted by the second user from the second device for accessing the second storage volume.

16. The system of claim 10, wherein said invoking a lock protection comprises: acquiring a non-conventional or conventional lock before said storing in order to obtain exclusive right for accessing the available entry on a user space task list, and release the lock after said storing.

17. The system of claim 1, wherein said network infrastructure further comprises local area network (LAN), wide area network (WAN), corporate storage network, corporate Intranet and/or the Internet and comprises wired and/or wireless communication links for facilitating said accessing through the World Wide Web.

18. The system of claim 2 further comprising: constructing a second storage volume pool by executing the storage volume pool automatic construction protocol between a control server and each of a plurality of storage servers for delivering said storage services to a plurality of user devices.

19. A method implemented by a web system for delivering storage service, the web system having at least a plurality of storage servers, a plurality of user devices, one console device and one control server, the method comprising:
interconnecting, through a network infrastructure, the storage servers, user devices, console device and control server;
executing a storage volume pool automatic construction protocol between the control server and each of the storage servers to form a storage volume pool;
receiving a request for acquiring storage volume from a first one of the user devices of a first user;
assigning, through the storage volume pool, a first storage volume of a specific size to the first user for facilitating the first user from the first user device to remotely and exclusively access the first storage volume;
creating a mapping for controlling the exclusive accessing of the first storage volume; and
causing display of the first storage volume on the first user device and
permitting the first user from a browser on the first device performing a first task of accessing the first storage volume according to the mapping specified; and processing the first task including to:
   storing information of the first task into an available entry of a user space task list and invoking a lock for protecting the storing of the information;
   processing the first task in the background according to the information stored, and delivering a response to the browser on the first device without waiting for the completion of the first task; and
   responding to a second task received from the first device before completion of the first task when the second task being submitted from the browser for said accessing the first storage volume; and
   removing the stored information of the first task after the completion of the first task.

20. A method implemented by a web system for support storage operation, the web system having at least a plurality of storage servers, a plurality of user devices, one console device and one control server, the method comprising:
   interconnecting, through a network infrastructure, the storage servers, user devices, control server and console device;
   executing a storage volume pool automatic construction protocol between the control server and each of the storage servers to form a storage volume pool;
   causing display of the storage volume pool in a browser on the console device to facilitate operating and monitoring the storage servers through the storage volume pool displayed; and
   updating the storage volume pool in the browser to reflect the dynamic changing status of the storage servers in response to one or more tasks submitted from the browser on the console device, and
   processing the one or more tasks to carry out each task that includes:
     storing information of a first task into an available entry of a user space task list and invoking a lock protection for protecting the storing of the information;
     processing the first task in the background, according to the information stored, and delivering a response the browser on the console device without waiting for the completion of the first task; and
     responding to a second task received from the console device before completion of the first task when the second task being submitted from the browser for said operating and/or monitoring; and
     removing the stored information of the first task after the completion of the first task.

\* \* \* \* \*

UNITED STATES PATENT AND TRADEMARK OFFICE
CERTIFICATE OF CORRECTION

PATENT NO. : 11,178,234 B1
APPLICATION NO. : 16/879632
DATED : November 16, 2021
INVENTOR(S) : Sheng Tai Ted Tsao It is certified that error appears in the above-identified patent and that said Letters Patent is hereby corrected as shown below:

In the Claims

In Column 15, Line 8, in Claim 19, please replace "the first task;" with ---the first task;;---.
In Column 16, Line 15, in Claim 20, please replace "deliver a response" with ---deliver a response to---.

Signed and Sealed this
Twenty-fourth Day of May, 2022

Katherine Kelly Vidal
*Director of the United States Patent and Trademark Office*